United States Patent Office 3,709,925
Patented Jan. 9, 1973

3,709,925
ACETYLENIC CARBAMATES
Kenneth Bowden, Bramfield, Robin Alastair Davis, Cookham, Derek William Hills, Welwyn Garden City, and George Sidney Sach, Welwyn, England, assignors to Smith Kline & French Laboratories Limited, Welwyn Garden City, County of Hertford, England
No Drawing. Filed Dec. 22, 1969, Ser. No. 887,350
Claims priority, application Great Britain, Dec. 10, 1968, 58,730/68
Int. Cl. C07c 101/00
U.S. Cl. 260—471 C                                    11 Claims

ABSTRACT OF THE DISCLOSURE

The compounds are 4 - methyl or ethyl - 4 - (N-phenyl or N - 2 - phenylcyclopropylcarbamoyloxy) - 2 - butynyltri-lower alkylammonium salts having ganglion stimulant activity and intermediates in the preparation thereof.

---

This invention relates to novel quaternary ammonium acetylenic carbamates having pharmacological activity and to intermediates for preparing them.

The quaternary ammonium acetylenic carbamates of this invention are represented by the following formula:

FORMULA I

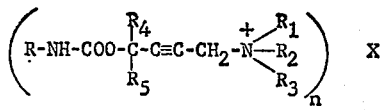

in which:

R represents phenyl, 2 - phenylcyclopropyl, said phenyl moieties being optionally substituted by lower alkyl, for example methyl or ethyl, or halo, for example chloro or fluoro, substituents;

$R_1$, $R_2$ and $R_3$ which may be the same or different, each represent a lower alkyl group, for example methyl;

$R_4$ and $R_5$ which may be the same or different, either both represent methyl or ethyl or $R_4$ represents methyl when $R_5$ represents hydrogen;

$n$ is 1, 2 or 3 and

X represents a pharmaceutically acceptable anion being monovalent when $n$ is 1, divalent when $n$ is 2 and trivalent when $n$ is 3.

The anions represented by X in Formula I are anions from inorganic acids and are monovalent, for example halide such as chloride or bromide, divalent for example sulfate or trivalent for example phosphate.

The compounds of Formula I in which R is a 2-phenylcyclopropyl group may exist in either the cis or trans form and all such isomers are included within the scope of the invention, although the trans isomers are pharmacologically preferred as usually being more active.

The compounds of Formula I may be prepared by reacting an alcohol selected from the following formulas:

FORMULA II                    FORMULA III

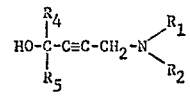       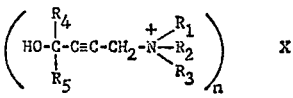

in which $R_1$, $R_2$, $R_3$, $R_4$, $R_5$, $n$ and X are as defined in Formula I, with an isocyanate of the formula RNCO or an acid azide of the formula $RCON_3$, R being as defined in Formula I. The reaction is preferably carried out in an inert organic solvent such as, for example, ether, benzene, petroleum or acetonitrile. If necessary, the reaction of the isocyanate may be catalysed by a base, for example pyridine or triethylamine, or by cobaltous 2-ethylhexanoate. When an alcohol of Formula III is used, a quaternary ammonium compound of Formula I is obtained directly. When an alcohol of Formula II is used, the reaction product can be converted to a compound of Formula I by reaction with a reactive lower alkyl ester of an inorganic acid, preferably in the presence of an inert solvent, for example ether or acetone.

Alternatively, the compounds of Formula I may be prepared by suitable treatment of a compound of the following formula:

FORMULA IV

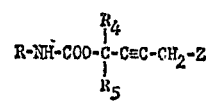

in which R, $R_4$ and $R_5$ are as defined in Formula I and Z represents halo or a tertiary amino group $NR_1R_2$, where $R_1$ and $R_2$ are each lower alkyl groups. Reaction of a compound of Formula IV in which Z is halo with an appropriate tertiary amine of the formula $NR_1R_2R_3$ will give a compound of Formula I directly, or else reaction with a secondary amine of the formula $HNR_1R_2$ will give the corresponding tertiary amine of Formula IV in which Z is $NR_1R_2$. The tertiary amine can then be converted to a compound of Formula I by reaction with a reactive lower alkyl ester of an inorganic acid as previously mentioned.

The compounds of Formula IV are novel compounds and form part of the present invention.

The compounds of Formula IV in which Z is halo may be prepared either by reacting an amine of the formula $RNH_2$ with a 4 - halo - 2 - butynyl haloformate of the following formula:

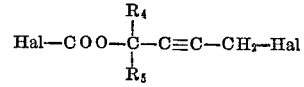

where R, $R_4$ and $R_5$ have the same meaning as in Formula I and Hal represents halo, preferably chloro, or by reacting an alcohol of the following formula:

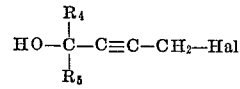

where $R_4$ and $R_5$ have the same meaning as in Formula I and Hal represents halo, with an appropriate isocyanate or acid azide in a manner similar to that described above.

The quaternary ammonium acetylenic carbamates of this invention have pharmacological activity in the animal body. In particular, the compounds of Formula I have muscarinic ganglion stimulant activity (by which we mean activity which can be blocked by atropine) in the autonomic nervous system and are therefore of use as hypertensive agents. For instance, the pharmaceutically acceptable salts, for example the iodide, of the 4-methyl-4-(N-phenylcarbamoyloxy)pent - 2 - ynyltrimethylammonium cation have been found to have pronounced and selective ganglion stimulant activity.

The activity of the compounds of this invention may be demonstrated by administration to anesthetized cats to produce pressor activity and increase in salivary flow at doses of about from 0.001–0.010 mg./kg., administered by intravenous injection.

The compounds of the invention may also have herbicidal activity.

For therapeutic use, the pharmacologically active compounds of the invention will normally be administered as a pharmaceutical composition comprising as the essential active ingredient at least one such compound in association with a pharmaceutical carrier therefor. Advantageously, the composition will be made up in a dosage unit form appropriate to the desired mode of administration, which will normally be by the parenteral route. For parenteral administration the dosage unit may take the form of, for example, a sterile solution, such as a saline solution, of the active ingredient packaged in a suitable container such as an ampoule. Such a solution may be administered intravenously, if necessary after being diluted with further inert liquid.

The following examples are not limiting but illustrate the invention.

EXAMPLE 1

To phenylisocyanate (5.15 g.) dissolved in dry ether (100 ml.) is added 5-dimethylaminopent-3-yn-2-ol (5.5 g.). This alcohol is described by Reppe et al. in Annalen, 1955, 596, 25–38; C.A. 1956, 16774a. The solution is allowed to stand at room temperature for two days, then filtered. The solvent is removed from the filtrate to give 4-(N-phenylcarbamoyloxy)pent - 2 - ynyldimethylamine. To 11.5 g. of the above prepared amine, dissolved in dry acetone (250 ml.), is added iodomethane (13.3 g.) and the mixture is kept at 0–5° C. for three days. The solvent is removed under reduced pressure to yield an oil, which is dissolved in distilled water, and the solution is filtered and freeze-dried to yield 4-(N-phenylcarbamoyloxy)pent-2-ynyltrimethylammonium iodide in the form of the monohydrate, M.P. 77–80° C.

EXAMPLE 2

Phenylisocyanate (8.43 g.) is added to a stirred solution of 10 g. of 2-methyl-5-dimethylaminopent-3-yn-2-ol (described by Azerbaev et al. in Vestn. Akad. Nauk. Kaz. S.S.R. 1964, 20, 60–62; C.A. 61, 10577h) dissolved in dry ether (200 ml.) and the resulting solution is allowed to stand at room temperature for 50 hours with the exclusion of moisture. The volume of solvent is reduced under diminished pressure, the mixture is filtered and the remainder of the solvent is removed under diminished pressure. The residual oil is triturated with petroleum (B.P. 60–80° C.) and the solid material obtained is filtered off and recrystallized from a mixture of ether and petroleum (B.P. 60–80° C.) and then from petroleum (B.P. 60–80° C.) to yield 4-methyl-4-(N-phenylcarbamoyloxy)pent-2-ynyldimethylamine, M.P. 81–82° C.

Iodomethane (1.64 g.) dissolved in dry ether (25 ml.) is added to 4- methyl-4-(N-phenylcarbamoyloxy)pent-2-ynyldimethylamine (1.0 g.) dissolved in dry ether (25 ml.) and the mixture is kept at 0–5° C. for three days. The crystalline precipitate is filtered off, washed with ether, dried and recrystallized from a mixture of ether and ethanol to give 4-methyl-4-(N-phenylcarbamoyloxy)pent-2-ynyltrimethylammonium iodide, M.P. 122.5–124° C.

EXAMPLE 3

To a stirred solution of dimethylamine (20.8 g.) in water (30.5 ml.), cooled in ice, is added dropwise sulfuric acid (50%) until the solution has a pH of 9. To the resulting solution is added formaldehyde (46.1 ml. of a 40% aqueous solution) followed by 3-ethylpentyn-3-ol (43 g.). A solution of cupric sulfate (1.96 g.) in water (19.6 ml.) is added and the solution is adjusted to a pH of 8.4 by the addition of dimethylamine. The solution is stirred at 80° C. for two hours, cooled and then poured into aqueous ammonia (d=0.88; 143 ml.). The resultant mixture is continuously extracted with ether for 18 hours. The ethereal extract is dried over magnesium sulfate, then filtered. The ether is removed from the filtrate by distillation and the residual light-brown oil is distilled under reduced pressure to give 3-ethyl-6-dimethylaminohex-4-yn-3-ol, B.P. 110° C./18 mm. pressure.

To a stirred solution of 3-ethyl-6-dimethylaminohex-4-yn-3-ol (10 g.) in 30 ml. of dry petroleum (B.P. 40–60° C.) is added freshly distilled phenylisocyanate (7.04 g.) followed by cobaltous 2-ethylhexanoate (0.0888 g.) dissolved in 10 ml. of dry petroleum (B.P. 40–60° C.) The mixture is allowed to stand at room temperature for four days and the solvent is removed under reduced pressure. The residue is recrystallized from petroleum (B.P. 60–80° C.) to give 13.8 g. of crystalline material, which is further crystallized from petroleum (B.P. 60–80° C.) to give 4-ethyl-4-(N-phenylcarbamoyloxy)hex-2-ynyldimethylamine, M.P. 76–78.5° C.

To 4-ethyl-4-(N-phenylcarbamoyloxy)hex - 2 - ynyldimethylamine (3.0 g.) in dry ether (100 ml.) is added, with stirring, iodomethane (4.43 g.) and the mixture is then kept at 0–5° C. for one week, moisture being excluded. The crystalline product so formed is filtered off and recrystallized from a mixture of ethanol and ether to yield 4-ethyl-4-(N-phenylcarbamoyloxy)hex-2-ynyltrimethylammonium iodide, M.P. 183–184° C. (with decomposition).

EXAMPLE 4 dl-trans-2-phenylcyclopropylisocyanate (7.9 g.) with 1-dimethylamino-4-methyl-2-pentyn-4-ol (7.05 g.) and pyridine (0.1 ml.) is dissolved in benzene (50 ml.) and the resulting mixture is heated under reflux for three hours. The solution is concentrated under reduced pressure to a yellow oil which is dissolved in ether (100 ml.), washed with water (2× 100 ml. portions) and extracted with N hydrochloric acid. The acid layer is made alkaline with 40% sodium hydroxide solution to a pH of 9, the precipitated oil is extracted with ether (3× 50 ml. portions) and the ether extract is washed with water (2× 100 ml. portions) and dried over magnesium sulfate. The ethereal solution is concentrated under reduced pressure to give an oil. The oil (5.31 g.), prepared as described above, is dissolved in benzene (50 ml.) and the solution is passed down a column of alumina (Grade IV). The product is collected in the first 625 ml. of eluate which is concentrated under reduced pressure to give an oil.

The oil (17.5 g.), prepared in the foregoing manner, in benzene (150 ml.) is mixed with iodomethane (41 ml.) and the mixture so formed is allowed to stand for one hour. The solvent is decanted from the solid which forms. The solid is triturated with acetone to give colourless crystals which are filtered off. The crystals are crystallized from a mixture of ethanol and ether to give dl-trans - 4 - [N-(2 - phenylcyclopropyl)carbamoyloxy]-4-methyl-2-pentynyltrimethylammonium iodide, M.P. 188–189° C. (with decomposition).

EXAMPLE 5

By the procedure of Example 2, using the following isocyanates as starting materials:

p-chlorophenylisocyanate
m-chlorophenylisocyanate
p-tolylisocyanate the products are, respectively:

4-(N-p-chlorophenylcarbamoyloxy)-4-methyl-2-pentynyltrimethylammonium iodide
4-(N-m-chlorophenylcarbamoyloxy)-4-methyl-2-pentynyltrimethylammonium iodide
4-methyl-4-(N-p-tolylcarbamoyloxy)-2-pentynyltrimethylammonium iodide

EXAMPLE 6

By the procedure of Example 4 using the following isocyanates as starting materials:

2-(p-chlorophenyl)cyclopropylisocyanate
2-(m-tolyl)cyclopropylisocyanate the products are, respectively:

4-[N-(2-p-chlorophenylcyclopropyl)carbamoyloxy]-4-methyl-2-pentynyltrimethylammonium iodide 4-methyl-4-[N-(2-m-tolylcyclopropyl)carbamoyloxy]-2-pentynyltrimethylammonium iodide.

EXAMPLE 7

4-methyl - 4 - (N-phenylcarbamoyloxy)pent-2-ynyltrimethylammonium iodide, prepared as in Example 2, is dissolved in methanol, the resulting solution is passed through an ion exchange resin (sulfate form) and the solvent is removed to give bis[4-methyl-4-(N-phenylcarbamoyloxy)pent-2-ynyltrimethylammonium] sulfate.

Similarly, passing a methanol solution of 4-methyl-4-(N-phenylcarbamoyloxy)pent - 2 - ynyltrimethylammonium iodide through an ion exchange resin (phosphate form) and removing the solvent gives tris[4-methyl-4-(N-phenylcarbamoyloxy)pent - 2 - ynyltrimethylammonium] phosphate.

EXAMPLE 8

4-methyl - 4 - (N-phenylcarbamoyloxy)pent - 2 - ynyltrimethylammonium iodide is dissolved in distilled water so that the resultant solution contains 10 mg./ml. of the iodide. This solution is then filtered through a bacteria proof filter and transferred aseptically into 2 ml. ampoules which are then sealed. For intravenous injection the contents of each ampoule may be mixed with 500 ml. of normal saline solution, the resulting solution being injected at a rate of, for example, 2 ml./min.

What is claimed is:

1. A compound of the formula:

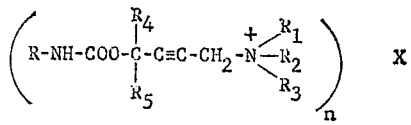

in which:
R is phenyl or 2-phenylcyclopropyl, said phenyl being optionally substituted by lower alkyl or halo;
$R_1$, $R_2$ and $R_3$ are lower alkyl;
$R_4$ and $R_5$ are either both methyl or ethyl or $R_4$ is methyl when $R_5$ is hydrogen;
$n$ is 1, 2, or 3 and
X is a pharmaceutically acceptable anion being monovalent when $n$ is 1, divalent when $n$ is 2 and trivalent when $n$ is 3.

2. A compound according to claim 1 in which R is 2-phenylcyclopropyl, said phenyl being optionally substituted by lower alkyl or halo.

3. A compound according to claim 2 in which the compound is in the trans form.

4. A compound according to claim 1 in which R is phenyl, $R_1$, $R_2$, $R_3$ and $R_4$ are methyl, $R_5$ is hydrogen, $n$ is 1 and X is iodide.

5. A compound according to claim 1 in which R is phenyl, $R_1$, $R_2$, $R_3$, $R_4$ and $R_5$ are methyl, $n$ is 1 and X is iodide.

6. A compound according to claim 1 in which R is phenyl, $R_1$, $R_2$ and $R_3$ are methyl, $R_4$ and $R_5$ are ethyl, $n$ is 1 and X is iodide.

7. A compound according to claim 1 in which R is 2-phenylcyclopropyl, $R_1$, $R_2$, $R_3$, $R_4$ and $R_5$ are methyl, $n$ is 1 and X is iodide.

8. A compound according to claim 1 in which $R_4$ and $R_5$ are both methyl or ethyl.

9. A compound according to claim 1 in which R is phenyl.

10. A compound of the formula:

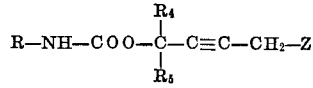

in which:
R is 2-phenylcyclopropyl, said phenyl being optionally substituted by lower alkyl or halo;
$R_4$ and $R_5$ are either both methyl or ethyl or $R_4$ is methyl when $R_5$ is hydrogen and
Z is halo or

where $R_1$ and $R_2$ are each lower alkyl.

11. A compound according to claim 10 in which $R_4$ and $R_5$ are both methyl or ethyl.

References Cited

UNITED STATES PATENTS

| | | | |
|---|---|---|---|
| 3,100,223 | 8/1963 | Hopkins et al. | 260—472 |
| 2,973,385 | 2/1961 | Rorig | 260—472 |
| 3,226,426 | 12/1965 | Hopkins et al. | 260—468 |

FOREIGN PATENTS

| | | | |
|---|---|---|---|
| 15,115 | 7/1964 | Japan | 260—468 |

LORRAINE A. WEINBERGER, Primary Examiner

R. S. WEISSBERG, Assistant Examiner

U.S. Cl. X.R.

260—472; 424—300